April 20, 1937.  C. C. FARMER  2,077,923
EMPTY AND LOAD BRAKE DEVICE
Filed Jan. 7, 1936  2 Sheets-Sheet 1
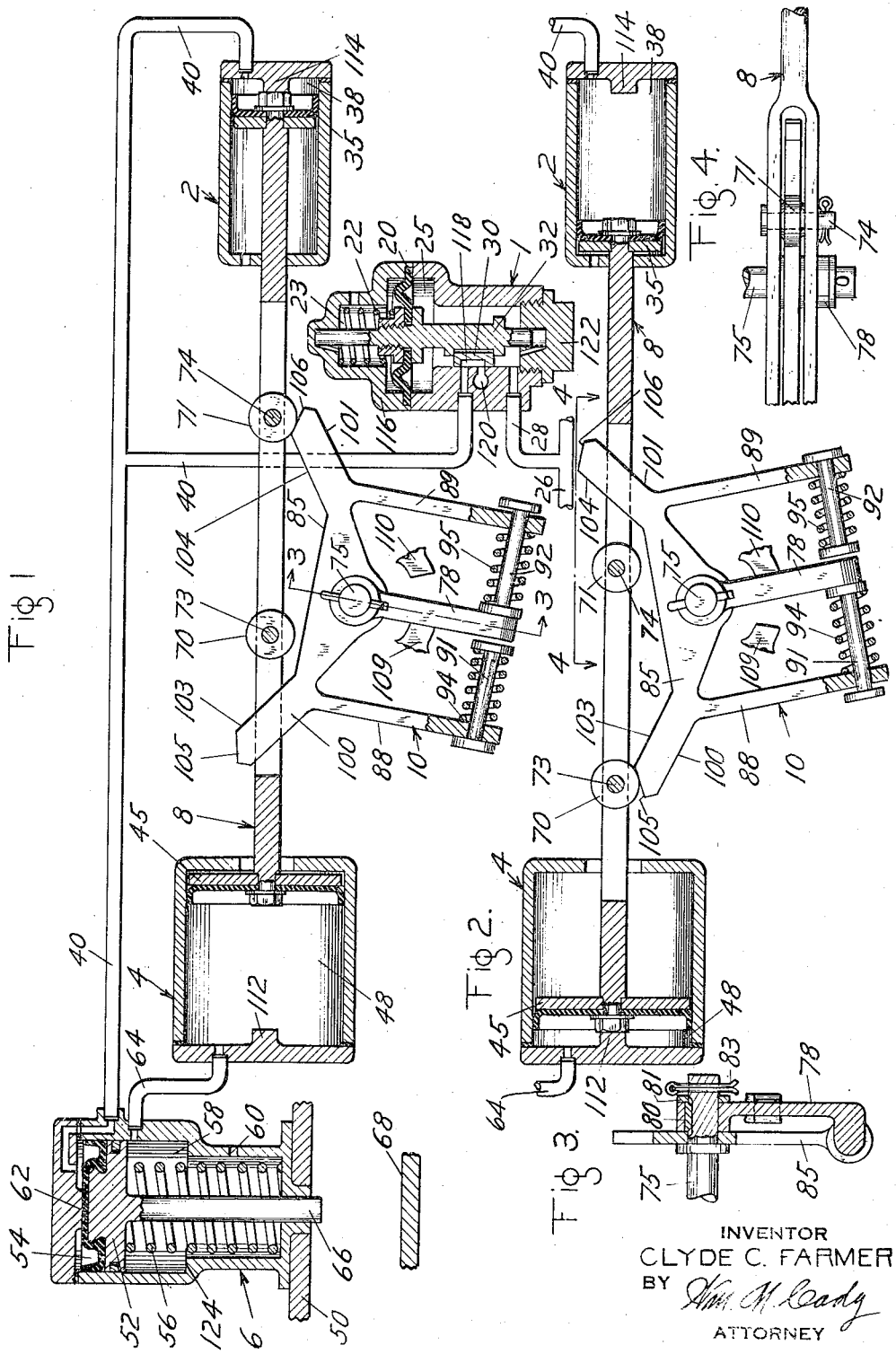
INVENTOR
CLYDE C. FARMER
BY
ATTORNEY April 20, 1937. C. C. FARMER 2,077,923
EMPTY AND LOAD BRAKE DEVICE
Filed Jan. 7, 1936 2 Sheets-Sheet 2
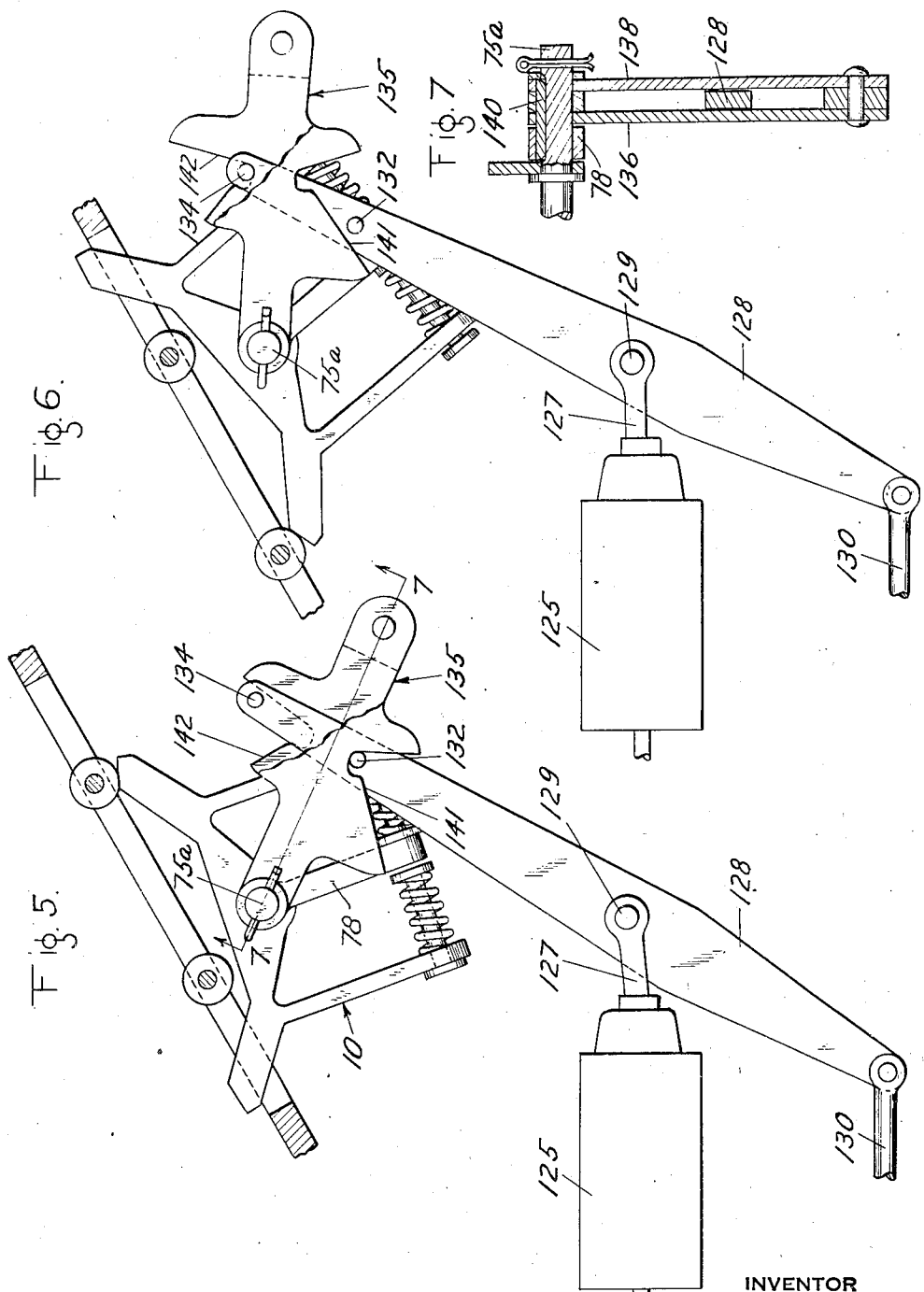
INVENTOR
CLYDE C. FARMER
BY Wm. M. Cady
ATTORNEY Patented Apr. 20, 1937

2,077,923

UNITED STATES PATENT OFFICE 2,077,923

EMPTY AND LOAD BRAKE DEVICE

Clyde C. Farmer, Pittsburgh, Pa., assignor to The Westinghouse Air Brake Company, Wilmerding, Pa., a corporation of Pennsylvania Application January 7, 1936, Serial No. 57,894

20 Claims. (Cl. 188—195)

This invention relates to a fluid pressure brake equipment and more particularly to a brake equipment in which the brakes are applied with greater force on loaded cars than on empty cars.

It is the principal object of this invention to provide means automatically operative to condition the brake equipment for empty car operation or for loaded car operation in accordance with variations in the weight of the material forming the load on the vehicle.

A further object of the present invention is to provide an automatic change-over mechanism for empty and load brake equipments and which may be employed to convert brake equipments from manual operation to automatic operation.

Another object of the invention is to provide an automatic change-over mechanism for empty and load brake equipments and incorporating means to prevent a change in the condition of the equipment by the change-over mechanism during an application of the brakes.

A further object of the invention is to provide an improved automatic change-over mechanism for empty and load brake equipments which is simple and rugged in construction and which is positive in operation.

Other objects of the invention and features of novelty will be apparent from the following description taken in connection with the accompanying drawings in which, Fig. 1 is a diagrammatic view, largely in section, of a change-over control mechanism embodying my invention, the control mechanism being shown in the position to condition the brake equipment for empty car operation, Fig. 2 is a fragmentary diagrammatic view of the change-over control mechanism shown in Fig. 1, but showing the mechanism in position to condition the brake equipment for loaded car operation, Fig. 3 is a sectional view taken substantially along the line 3—3 of Fig. 1, Fig. 4 is an elevational view taken substantially from the plane of the line 4—4, Fig. 5 is an elevational view of a modified form of change-over mechanism embodying my invention, the mechanism being shown in the position to condition the equipment for empty car operation, Fig. 6 is a view of the equipment shown in Fig. 5 and showing the mechanism in the position to condition the equipment for loaded car operation, and Fig. 7 is a sectional view taken substantially along the line 7—7 of Fig. 5, Referring to Fig. 1 of the drawings, the change-over control mechanism therein illustrated comprises a cut-off valve 1, a load change-over cylinder 2, an empty change-over cylinder 4, a strut cylinder 6, a push rod or actuating element 8, and an actuating device indicated generally by the reference numeral 10.

The cut-off valve 1 comprises a casing having a movable abutment in the form of a diaphragm 20 associated therewith. The diaphragm 20 is subject on one side to the pressure of a spring 22, which is mounted in a chamber 23, and is subject on the other side to the pressure of the fluid in a chamber 25 which is constantly connected to the brake pipe 26 by way of a branch pipe 28.

The chamber 25 has mounted therein a slide valve 30 which is moved by means of a stem 32 secured to the diaphragm 20 upon a seat formed on the casing of the cut-off valve device.

The load change-over cylinder 2 comprises a casing having a bore therein in which is mounted a piston 35, which is secured to one end of the push rod or actuating element 8, and which is subject on one side to the pressure of the fluid in a chamber 38, which is connected by way of a pipe 40 with a port in the seat of the slide valve 30 of the cut-off valve device 1.

The empty change-over cylinder 4 comprises a casing having a bore therein in which is mounted a piston 45, which is secured to the other end of the push rod or actuating element 8, and which is subject on one side to the pressure of the fluid in a chamber 48.

The strut cylinder 6 comprises a casing which is secured on the sprung portion of a car structure, indicated at 50, and having a bore therein in which is mounted a piston 52 which is subject on one side to the pressure of the fluid in a chamber 54, which is connected by way of the pipe 40 with the port in the seat of the slide valve of the cut-off valve device 1.

The piston 52 is subject on the other side to the pressure of a spring 56, which is mounted in a chamber 58, which is constantly connected to the atmosphere by way of a passage 60.

The piston 52 is normally urged into engagement with a stop 62 formed on the cover of the casing of the strut cylinder, and when the piston is in engagement with the stop 62 it uncovers a port communicating with a passage and pipe 64 so as to establish communication between the chamber 48 on the face of the piston 45 of the load change-over cylinder 4 and the chamber 58 on the spring side of the piston 52.

The piston 52 has a stem 66 associated therewith and projecting from the chamber 58, and, as will hereinafter more fully appear, this stem is adapted to engage at certain times a portion of the unsprung portion of a car truck.

The push rod or actuating element 8 comprises a member having its end portions rigidly secured to the pistons 35 and 45 of the empty and load change-over cylinders, and having its intermediate portion divided, as is best shown in Fig. 4 of the drawings. The actuating element 8 has rollers 70 and 71 positioned between the divided portions thereof and rotatably mounted on pins 73 and 74 respectively. The rollers 70 and 71 are spaced from the ends of the divided portion of the actuating element 8, and are spaced apart a substantial distance as is best shown in Figs. 1 and 2 of the drawings.

The actuating device 10 comprises a shaft 75 which is rotatably supported from the car structure by suitable means, not shown, and which is connected to any suitable device, not shown, for varying the braking power. This device may be a valve mechanism for controlling the supply of fluid under pressure to a brake cylinder, or it may be any other suitable means for varying the braking power, such as the device shown in my U. S. Patent No. 1,980,328, issued November 13, 1934, which has a rod 14 which is rotated to condition the equipment for empty car braking or for loaded car braking.

The rod 75 has rigidly secured thereto a movable member 78 in the form of an arm which is secured rotatively relative to the rod 75 by means of a key 80, and which is held in position axially of the rod 75 by means of a washer 81 and a cotter pin 83.

The rod 75 also has rotatively supported thereon an operating element 85 having spaced, substantially parallel arms 88 and 89 which have associated therewith plungers 91 and 92, respectively, having heads which are adapted to engage the movable member 78 and which are yieldingly urged towards the member 78 by means of springs 94 and 95, respectively.

The operating element 85 also has formed thereon diverging arms 100 and 101, which have formed thereon diverging cam faces 103 and 104 which are adapted to be engaged by the rollers 70 and 71, respectively, while these cam surfaces have located outwardly thereof oppositely disposed cam surfaces indicated at 105 and 106, respectively, which cam surfaces are also adapted to be engaged by the rollers associated with the actuating element 8.

The movable member 78 is adapted to be moved between spaced positions and the limits of its movement may be determined by the means controlled thereby, or by means of stops 109 and 110 associated with the car structure and adapted to be engaged by the member 78.

The actuating element 8 also has stop means associated therewith to determine the limits of its range of movement, and this means comprises a stop 112 formed on the cover of the piston chamber 48 and adapted to be engaged by an end of the actuating element 8 to determine the limit of movement of the actuating element in one direction, while the other end of its range of movement is determined by a stop 114 formed on the cover of the chamber 38 and adapted to be engaged by the other end of the actuating element 8.

The equipment is shown in Fig. 1 of the drawings in the position which it assumes when the change-over mechanism is in the position to condition the equipment for empty car operation, with the load on the car less than that required to effect operation of the change-over control mechanism to change the equipment over to loaded car operation, and with the fluid in the brake pipe maintained substantially at the pressure normally carried in the brake pipe.

When the pressure of the fluid in the brake pipe is maintained at substantially the pressure normally carried in the brake pipe, the force exerted by the fluid under pressure in the valve chamber 25 on the diaphragm 20 is greater than the opposing force exerted on the diaphragm 20 by the spring 22, which is proportioned so as to overcome the force exerted on the diaphragm 20 by the fluid under pressure in the valve chamber 25 when the pressure of the fluid in this chamber drops to a value substantially less than that usually carried in the brake pipe, such as thirty pounds. The diaphragm 20, therefore, is held in the position in which its movement is limited by engagement of the upper end of the stem 32 with the end of the bore in the casing section 116, and when the stem 32 is in this position, the slide valve 30 is in a position in which a cavity 118 establishes communication between the port associated with the pipe and passage 40 and an atmospheric passage 120.

As the pipe and passage 40 is connected to atmosphere, the chamber 38 of the load change-over cylinder 2 is maintained substantially at atmospheric pressure, while the chamber 54 on the face of the piston 52 of the strut cylinder 6 is also maintained at substantially atmospheric pressure, and, as a result, the piston 52 of the strut cylinder 6 will be held in engagement with the stop 62 by the spring 56, thus establishing communication between the pipe 64 and the chamber 58 on the spring side of the piston 52 so that the chamber 48 of the empty change-over cylinder 4 is connected to the atmosphere by way of the pipe and passage 64, the chamber 58 and the passage 60.

The apparatus controlled by the change-over mechanism is now in the position to condition the equipment for empty car operation, and if the pressure of the fluid in the brake pipe 26 is reduced to produce a service application of the brakes the equipment will operate to provide a degree of brake application suitable for an empty car. On a reduction in the pressure of the fluid in the brake pipe 26 to produce a service application of the brakes a reduction in the pressure of the fluid in the valve chamber 25 is effected, but this pressure will be maintained at a value high enough to maintain the diaphragm 20 against the spring 22 so that the slide valve 30 will be maintained in the position in which it is shown in Fig. 1 of the drawings. On the subsequent increase in the pressure of the fluid in the brake pipe 26 to release the brakes a similar increase will be effected in the pressure of the fluid in the slide valve chamber 25, and the equipment will remain in the position in which it is shown in Fig. 1 of the drawings.

If while the weight of the material forming the load on the car remains below the value for which the change-over mechanism is adjusted to respond to change the brake equipment over to loaded car operation, the pressure of the fluid in the brake pipe 26 is reduced to a relatively low value, such as below thirty pounds, the spring 22 will move the diaphragm 20 downwardly against the opposing pressure of the fluid in the chamber 25, and the slide valve 30 will thereupon be moved to a position in which it cuts off communication between the passage 40 and the atmospheric passage 120, and in which communication is established between the valve chamber 25 and the passage 40. Movement of the stem 32 by the spring 22 is limited by engagement of the lower end of the stem with the bottom of the bore in the plug 122 which closes the end of the valve chamber 25.

On movement of the slide valve 30 to this position fluid under pressure supplied to the valve chamber 25 from the brake pipe 26 flows from the valve chamber 25 to the passage 40, and therefrom to the chamber 54 on the face of the piston 52 of the strut cylinder 6, and on an increase in the pressure of the fluid in this chamber to a relatively low value, the force exerted by the fluid on the piston 52 overcomes the opposing force of the spring 56, and the piston 52 is moved downwardly against the spring 56 and into engagement with the shoulder 124 formed on the body of the strut cylinder 6. When the piston 52 is in this position communication is established between the chamber 54 and the passage and pipe 64, so that fluid under pressure supplied from the brake pipe 26 to the chamber 54 flows therefrom through the passage and pipe 64 to the chamber 48 on the face of the piston 45 of the empty change-over cylinder 4.

At the same time fluid under pressure supplied from the brake pipe 26 to the passage and pipe 40 flows therethrough to the chamber 38 on the face of the piston 35 of the load change-over cylinder 2, but as the piston 45 of the empty change-over cylinder 4 is of substantially greater area than the piston 35 of the load change-over cylinder 2 the force exerted by the fluid in the chamber 48 acting on the piston 45 will exceed that of the fluid in the chamber 38 acting on the piston 35 and the actuating element 8 will be maintained in the position in which it is shown in Fig. 1 of the drawings.

On an increase in the pressure of the fluid in the brake pipe 26, and therefore in the valve chamber 25, to a pressure above thirty pounds, the force exerted by the fluid under pressure in the chamber 25 on the diaphragm 20 will overcome the spring 22 and the diaphragm 20 will be moved upwardly and will move the stem 32 upwardly and thereby move the slide valve 30 to the position in which the cavity 118 establishes communication between the pipe and passage 40 and the atmospheric passage 120, and in which the slide valve cuts off communication between the valve chamber 25 and the pipe and passage 40.

When the slide valve 30 is moved to this position fluid is released from the pipe 40, and fluid will therefore be released from the chamber 38 on the face of the piston 35 of the load change-over cylinder 2, while fluid will also be released from the chamber 54 on the face of the piston 52 of the strut cylinder 6, and on a reduction in the pressure of the fluid in the chamber 54 to a relatively low value, the force exerted by the fluid in the chamber 54 on the piston 52 will be insufficient to overcome the opposing force of the spring 56, and the piston 52 will thereupon be moved by the spring 56 into engagement with the stop 62.

On movement of the piston 52 into engagement with the stop 62 communication is established between the passage and pipe 64 and the chamber 58 on the spring side of the piston 52, and fluid will thereupon be released to the atmosphere from the chamber 48 of the empty change-over cylinder 4 by way of the passage and pipe 64, the chamber 58 and the passage 60.

As the chambers 38 and 48 are both reduced to atmospheric pressure the change-over control mechanism will be maintained in the position in which it is shown in Fig. 1 of the drawings.

When the change-over control mechanism is in the position in which it is shown in Fig. 1 of the drawings, the cam surface 106 is in engagement with the roller 71, and the various parts of the change-over mechanism are arranged so that when the roller 71 and the cam surface 106 are in engagement, the movable member 78 will be held against the stop means 109, while the spring 95 will be compressed slightly between the arm 89 and the head of the plunger 92.

The spring 95 operates to yieldingly urge the movable member 78 into engagement with the stop 109, and also to yieldingly urge the cam surface 106 against the roller 71. The cam surface 106 is shaped so that when it is pressed against the roller 71 it tends to urge the roller 71 to the right, as viewed in Fig. 1 of the drawings, thereby tending to maintain the end of the actuating element in engagement with the stop 114, and to oppose movement of the actuating element from this position.

The stop 114 and the actuating element 8, as well as the other parts of the equipment, are arranged and proportioned so as to prevent movement of the actuating element 8 to the right, as viewed in Fig. 1 of the drawings, an amount sufficient to permit the roller 71 to move off from the cam surface 106, while these parts are also proportioned so as to prevent movement of the operating element 85 in a counterclockwise direction an amount sufficient to permit the spring 95 to expand to the limit permitted by the plunger 92.

The change-over control mechanism provided by this invention is constructed so that it will automatically condition the brake equipment for loaded car operation, if the weight of the material forming the load on the car is increased to an amount in excess of a predetermined amount, and if subsequently there is established in the brake pipe a fluid pressure of a value less than that to which the cut-off valve device is adapted to respond, which fluid pressure condition may occur when the brake equipment of the car is recharged following the connection of the car into a train.

On an increase in the weight of the material forming the load on the car, the sprung portion 50 of the car structure moves closer to the unsprung portion 68 of the car truck so that the range of movement permitted the piston of the strut cylinder 6 is reduced.

With the pressure of the fluid in the brake pipe 26 and in the valve chamber 25 at a value less than that required to overcome the opposing pressure of the spring 22 acting on the diaphragm 20 of the valve device 1, the spring 22 will maintain the stem 32 in its lower position and the slide valve 30 will be held in the position to establish communication between the valve chamber 25 and the pipe and passage 40, and to cut off communication between the pipe and passage 40 and the atmospheric passage 120.

As the brake pipe pressure is increased in recharging the brake pipe, the diaphragm 20 will remain in its lower position until the pressure in the brake pipe is increased to a value such that the force exerted by the fluid on the diaphragm 20 exceeds the opposing force of the spring 22.

During this period fluid under pressure supplied from the brake pipe to the valve chamber 25 will flow therefrom through the passage and pipe 40 to the chamber 38 on the face of the piston 35 of the load change-over cylinder 2, and also to the chamber 54 on the face of the piston 52 of the strut cylinder 6.

On an increase in the pressure of the fluid in the chamber 54 of the strut cylinder 6, the piston 52 will be forced downwardly against the spring 58, but after a limited amount of movement of the piston 52 the stem 66 will engage the unsprung portion 68 of the car truck and prevent further downward movement of the piston 52.

If the weight of the material forming the load on the car exceeds a predetermined amount the stem 66 will engage the portion 68 of the car truck before the piston 52 has moved downwardly to a position to establish communication between the chamber 54 and the passage and pipe 64 leading to the chamber 48 on the face of the piston 45 of the empty change-over cylinder 4. The chamber 48, therefore, will not be supplied with fluid under pressure and will be maintained substantially at atmospheric pressure.

Fluid supplied from the brake pipe 26 to the passage and pipe 40 will also be supplied to the chamber 38 of the load change-over cylinder 2, and on an increase in the pressure of the fluid in this chamber, the piston 35 will be moved to the left, as viewed in Fig. 1 of the drawings, this movement being unopposed by fluid under pressure acting on the piston 45 as the chamber 48 is maintained at atmospheric pressure.

On movement of the piston 35 to the left, the actuating element 8 is also moved to the left and the roller 71 is therefore caused to move across the cam surface 106, and during this movement of the roller 71 across the cam surface 106 the operating element 85 will be moved in a clockwise direction somewhat, thereby slightly further compressing the spring 95 and causing the movable member 78 to be more firmly pressed against the stop 109.

When the roller 71 has moved past the corner separating the cam surface 106 and the cam surface 104, the spring 95 tends to expand and to move the operating element 85 in a counterclockwise direction so as to maintain the cam surface 104 in engagement with the roller 71. On slight further movement of the actuating element 8 to the left, as viewed in Fig. 1, the spring 95 will have expanded to the limit permitted by the plunger 92 and will not effect further movement of the operating element 85.

On still further movement of the actuating element 8 the roller 70 will engage the cam surface 103 and as the roller 70 moves across this cam surface it will move the operating element 85 in a counterclockwise direction, thereby moving the plunger 91 against the face of the movable member 78, so that on further movement of the operating element in a counterclockwise direction, movement of the operating element 85 will be transmitted through the spring 94 to the head of the plunger 91 and therefrom to the movable member 78, and will cause this member to move away from the stop 109 and into engagement with the stop 110.

After the movable member 78 is moved into engagement with the stop 110, and on further movement of the actuating element 8 to the left, as viewed in Fig. 1 of the drawings, the arm 88 will be moved towards the movable member 78 and the spring 94 will be compressed somewhat. Thereafter the roller 70 will move past the corner separating the cam surface 103 and the cam surface 105, and, after the roller 70 moves beyond this corner, the spring 94 will expand somewhat and move the arm 88 in a clockwise direction, so that the cam surface 105 acting on the roller 70 tends to assist movement of the actuating element 8 to the left, as viewed in Fig. 1 of the drawings, with the result that the actuating element 8 will be yieldingly urged into engagement with the stop 112 formed on the cover of the empty change-over cylinder 4.

The change-over mechanism is now substantially in the position shown in Fig. 2 of the drawings, and is in the position to condition the brake equipment for loaded car operation.

The cam surface 105 and the other parts of the change-over mechanism are arranged so that when the roller 70 is in engagement with the cam surface 105 the movable member 78 will be held against the stop 110, while the spring 94 will be compressed somewhat between the arm 88 and the head of the plunger 91. The spring 94 thereupon operates to yieldingly urge the movable member 78 into engagement with the stop 110, and also to yieldingly urge the cam surface 105 against the roller 70. The cam surface 105 is arranged so that when it is pressed against the roller 70 it tends to urge the roller 70 to the left, as viewed in Fig. 2 of the drawings, thereby tending to maintain the end of the actuating element 8 in engagement with the stop 112 and to resist return movement of the actuating element.

On an increase in the pressure of fluid in the brake pipe 26, and in the valve chamber 25, to approximately thirty pounds, the force exerted by the fluid in the chamber 25 on the diaphragm 20 will overcome the opposing force of the spring 22 and the diaphragm and stem 32 will be moved upwardly, thereby moving the slide valve 30 to the position in which it is shown in Fig. 1 of the drawings, in which position the slide valve cuts off communication between the valve chamber 25 and the pipe and passage 40, and establishes communication between the pipe and passage 40 and the atmospheric passage 120, and the diaphragm will be held in this position as long as the pressure in the brake pipe is maintained at a value substantially equal to that normally carried in the brake pipe. This releases the fluid under pressure present in pipe 40 and in the chamber 54 on the face of the piston 52 of the strut cylinder 6, with the result that the piston 52 is moved into engagement with the stop 62 by means of the spring 56. The fluid present in the chamber 38 on the face of the piston 35 of the load change-over cylinder 2 is also released to the atmosphere at this time.

If while the change-over mechanism is in the position in which it is shown in Fig. 2 of the drawings, that is the position to condition the brake equipment for loaded car operation, the pressure of the fluid in the brake pipe is reduced for the purpose of producing a service application of the brakes, the brake equipment controlled by the change-over mechanism will operate to produce a braking effect suitable for a loaded car.

On the reduction in brake pipe pressure to produce a service application of the brakes a reduction in the pressure of the fluid in the valve chamber 25 will take place, but this pressure will be maintained at a value high enough to maintain the diaphragm 20 against the spring 22 so that the slide valve 30 will be maintained in the position in which it is shown in Fig. 1 of the drawings. On the subsequent increase in the pressure of the fluid in the brake pipe 26 to release the brakes a similar increase will be effected in the pressure of the fluid in the slide valve chamber 25, and the equipment will remain in the position in which it is shown in Fig. 2 of the drawings.

If while the weight of the material forming the load on the car remains above the value for which the change-over mechanism is adapted to respond to change the brake equipment over to loaded car operation, the pressure of the fluid in the brake pipe is reduced to a relatively low value, such as may occur on an emergency application of the brakes or when the car is removed from a train, a similar reduction in the pressure of the fluid in the valve chamber 25 will take place and the spring 22 will move the diaphragm 20 downwardly against the opposing pressure of the fluid in the chamber 25. The slide valve 30 will be moved to the position in which it cuts off communication between the passage 40 and the atmospheric passage 120, and in which communication is established between the valve chamber 25 and the passage 40.

On the subsequent increase in the pressure of the fluid in the brake pipe until the pressure thereon is raised to a value above thirty pounds fluid supplied from the brake pipe to the valve chamber 25 will flow therefrom through the passage 40 to the chamber 54 on the face of the piston 52 of the strut cylinder 6, and on an increase in the pressure of the fluid in this chamber to a relatively low value the force exerted by the fluid on the piston 52 overcomes the opposing force of the spring 56 and the piston 52 will thereupon be moved downwardly against the spring 56. The stem 66, however, will engage the portion 68 of the car truck before the piston 52 has moved to a position to establish communication between the chamber 54 and the passage and pipe 64 leading to the chamber 48 on the face of the piston 45 of the empty change-over cylinder 4. The chamber 48, therefore, will not be supplied with fluid under pressure and will be maintained substantially at atmospheric pressure.

Fluid supplied from the brake pipe 26 to the passage and pipe 40 will also flow to the chamber 38 of the load change-over cylinder 2, and the fluid under pressure in this chamber acting on the piston 35 will maintain the actuating element 8 in the position in which it is shown in Fig. 2 of the drawings.

On an increase in the pressure of the fluid in the brake pipe 26, and therefore in the valve chamber 25, to a pressure above thirty pounds the force exerted by the fluid under pressure in the chamber 25 on the diaphragm 20 will overcome the spring 22 and the diaphragm 20 will be moved upwardly and will move the stem 32 upwardly, thereby moving the slide valve 30 to the position in which the cavity 118 establishes communication between the pipe and passage 40 and the atmospheric passage 120, and in which the slide valve cuts off communication between the valve chamber 25 and the pipe and passage 40.

When the slide valve 30 is moved to this position fluid is released from the pipe 40, and fluid will therefore be released from the chamber 38 on the face of the piston 35 of the load change-over cylinder 2, while fluid will also be released from the chamber 54 on the face of the piston 52 of the strut cylinder 6, and on a reduction in the pressure of the fluid in the chamber 54 the piston 52 will be moved by the spring 56 into engagement with the stop 62.

If, while the change-over mechanism is in the position in which it is shown in Fig. 2 of the drawings, that is, in the position to condition the brake equipment for loaded car braking, the weight of the material forming the load on the car is reduced to an amount less than that required to effect operation of the change-over control mechanism to change the equipment over to loaded car operation, the change-over control mechanism provided by this invention will automatically operate to condition the equipment for empty car operation when the pressure in the brake pipe is reduced to a value less than thirty pounds and is subsequently increased.

On a decrease in the weight of the material forming the load on the car the sprung portion 50 of the car structure is moved away from the unsprung portion 68 of the car truck by the vehicle springs, which tend to return to their normal position on a reduction in the load imposed thereon.

When the pressure in the brake pipe 26, and in the valve chamber 25, is reduced below thirty pounds and is subsequently increased, which may occur on recharging the brake equipment of the car, the spring 22 holds the diaphragm 20 in its lower position so that the stem 32 maintains the slide valve 30 in a position to cut off communication between the passage 40 and the atmospheric passage 120, and to establish communication between the valve chamber 25 and the passage 40 until the pressure in the brake pipe is raised above thirty pounds.

During this period fluid supplied from the brake pipe to the valve chamber 25 flows by way of the passage and pipe 40 to the chamber 54 on the face of the piston 52 of the strut cylinder 6, and, on an increase in the pressure of the fluid in this chamber, the piston 52 is moved downwardly against the spring 56. As the sprung portion 50 of the car structure has been moved away from the unsprung portion 68 of the car truck the piston 52 is permitted to move downwardly into engagement with the shoulder 124 before the stem 66 engages the portion 68 of the car truck. When the piston 52 is in engagement with the shoulder 124, communication is established between the chamber 54 and the passage and pipe 64 which leads to the chamber 48 of the empty change-over cylinder 4, thereby permitting fluid supplied from the brake pipe to the chamber 54 to flow therefrom to the chamber 48, and on an increase in the pressure of the fluid in the chamber 48, the piston 45 is moved to the right, as viewed in Figs. 1 and 2 of the drawings, thereby moving the actuating element 8 to the right.

Fluid which is supplied to the pipe and passage 40 also flows to the chamber 38 on the face of the piston 35 of the load change-over cylinder 2, but as this piston is of substantially smaller diameter than the piston 45, the force exerted by the fluid in the chamber 38 on the piston 35 is insufficient to prevent movement of the actuating element by the fluid in the chamber acting on the piston 45.

On the initial movement of the actuating element 8 to the right the roller 70 moves across the cam surface 105, and because of the shape of this cam surface, the operating element 85 is moved in a counterclockwise direction, thus moving the arm 88 towards the movable member 78 and causing the spring 94 to be further compressed.

On further movement of the actuating element 8 to the right, as viewed in Fig. 2 of the drawings, the roller 70 moves past the corner between the cam surface 105 and the cam surface 103 and thereafter engages the cam surface 103 so that on movement of the roller 70 across the cam surface 103 the spring 94 may expand and move the operating element in a clockwise direction until the spring 94 has expanded to the limit permitted by the plunger 91.

On still further movement of the actuating element 8 to the right the roller 71 engages the cam surface 104, and as it moves across this cam surface it causes the operating element 85 to be moved in a clockwise direction, thereby moving the plunger 92 against the movable member 78 and causing the movable member 78 to be moved away from the stop means 110 and into engagement with the stop means 109.

On engagement of the movable member 78 with the stop means 109, and on further clockwise movement of the operating element 83, the arm 89 presses against the end of the spring 95 and causes this spring to be compressed between the arm 89 and the head of the plunger 92.

On further movement of the actuating element 8 to the right the roller 71 passes the corner between the cam surface 104 and the cam surface 106, and moves across the cam surface 106, which, because of its shape, permits the spring 95 to expand somewhat and effect rotation of the operating element in a counterclockwise direction, while the cam surface 106 presses against the roller 71 and tends to urge the actuating element 8 to the right so that the end thereof presses against the stop means 114 formed on the cover of the load change-over cylinder 2 as explained in detail above.

The change-over control mechanism is now in the position to condition the brake equipment for empty car operation.

On an increase in the pressure of the fluid in the brake pipe 26 to a value substantially equal to the pressure normally carried in the brake pipe, the force exerted by the fluid in the chamber 25 on the diaphragm 20 will exceed the opposing force of the spring 22, and the stem 32 is thereupon moved upwardly, thereby moving the slide valve 30 to the position to cut off communication between the chamber 25 and the pipe and passage 40, and to establish communication between the pipe and passage 40 and the atmospheric passage 120, thereby releasing fluid from the chambers of the empty and load change-over cylinders, and also from the chamber 54 of the strut cylinder 6 as explained in detail above.

If the brake pipe pressure is reduced below the pressure at which the cut-off valve device operates to permit fluid to flow to the pipe 40, and the brakes are applied, as in the case of an emergency application of the brakes, the mechanism operated by the movable member 78 may, due to the forces applied thereto while the brakes are applied, prevent movement of the movable member 78 away from either of its control positions.

The operating element 85, however, will be moved from the control position in which it is located to the other control position in the manner as described in detail above, and on this movement will compress one of the springs carried thereby, the movable member 78 remaining substantially stationary. On the release of the brakes the mechanism operated by the movable member 78 will be released so that the movable member 78 may be moved, and the spring which has been compressed will thereupon expand and move the movable member from the control position in which it was located to the other of the control positions.

This prevents damage to the brake equipment as a result of a change in the adjustment of the equipment during an application of the brakes, and at the same time insures that the equipment will be changed over from one class of service to the other when the brake pipe pressure is subsequently increased to effect the release of the brakes.

In Figs. 5 to 7 inclusive of the drawings, I have illustrated the change-over control mechanism provided by this invention in connection with one form of change-over mechanism which may be controlled by this control mechanism. This mechanism is shown as applied to a hopper type of car and the mechanism is secured to the lower face of the slope sheet (not shown) of the car. Any suitable means to attach the mechanism to the slope sheet may be employed. The change-over cylinders 2 and 4 may be provided with brackets having holes therein and adapted to receive bolts or rivets extending through aligned holes in the slope sheet in order to secure the mechanism to the car body. The change-over control mechanism employed in this equipment is substantially identical in construction and operation with the change-over control mechanism shown in Figs. 1 to 4 of the drawings, and identical reference numerals are employed for the parts of this equipment which correspond to the parts employed in the equipment shown in Figs. 1 to 4 inclusive.

In the system shown in Figs. 5 to 7 of the drawings the change-over control mechanism is employed to move fulcrum control means which controls the fulcrum point of a lever incorporated in the brake rigging, and thereby vary the braking force developed on an application of the brakes.

As shown in the drawings the equipment illustrated in Figs. 5 to 7, inclusive, comprises a brake cylinder 125 having a piston having a push rod 127 which is pivotally connected to a brake lever 128 by means of a pin 129. The brake lever 128 also has secured thereto at a point on one side of the pin 129 a brake applying member in the form of a brake pull rod 130, while the brake lever 128 has secured thereto on the other side of the pin 129 a pair of spaced pins 132 and 134 which project from opposite sides of the brake lever.

The fulcrum control means, which is indicated generally by the reference numeral 135, comprises spaced plates 136 and 138, which are disposed on opposite sides of the brake lever 128, as is best shown in Fig. 7 of the drawings, and which have one end thereof rigidly secured to the operating shaft 15a of the actuating means 10 by means of a key 140, which also serves to secure the movable member 78 to the operating shaft.

The plates 136 and 138 have similar notches or recesses 141 cut in the lower edges thereof, and also have similar recesses or notches 142 cut in the upper edges thereof.

When the fulcrum control means 135 is in the lower position, as shown in Fig. 5 of the drawings, the notches or recesses 140 extend around the pin 132, and on the supply of fluid under pressure to the brake cylinder 125, the piston acting through the push rod 127 moves the brake lever 128 about an axis determined by the pin 132.

When the fulcrum control means 135 is moved to the upper position, as shown in Fig. 6 of the drawings, the notches or recesses 141 move away from the pin 132, while the notches or recesses 142 move into engagement with the pin 134, and, on the supply of fluid under pressure to the brake cylinder 125, the brake lever 128 is caused to pivot about an axis determined by the pin 134. This conditions the equipment for loaded car operation.

As the pin 134 is located a somewhat greater distance from the pin 129, which connects the brake cylinder piston to the brake lever 128, than is the pin 132, the rate of movement of the brake pull rod 130 relative to the rate of movement of the brake cylinder piston will be less rapid when the brake lever 128 pivots around the pin 134 than is the case when the brake lever pivots around the pin 132, and hence a greater braking force will be developed when the brake lever pivots around the pin 134 than is developed when the brake lever pivots around the pin 132.

The change-over control mechanism employed in the equipment shown in Figs. 5 to 7 of the drawings operates in the manner described in detail in connection with the embodiment shown in Figs. 1 and 2 of the drawings to move the movable member 78 between spaced positions, thereby effecting oscillation of the shaft 75a, and movement of this shaft is transmitted to the fulcrum control means 135 to move it between the lower or empty car position, as shown in Fig. 5, and the upper or loaded car position, as shown in Fig. 6 of the drawings.

In the equipment shown in Figs. 5 and 6 of the drawings the limits of movement of the movable member 78 are determined by engagement of the bottoms of the recesses 141 and 142 on the fulcrum control means 135 with the pins 132 and 134, respectively, and hence no special stop means to determine the limits of movement of this member are required.

While one form of change-over control mechanisms embodying my invention, together with one form of change-over mechanism which may be actuated by the control mechanism have been illustrated and described in detail, it should be understood that the invention is not limited to these details of construction and that numerous modifications and changes may be made without departing from the scope of the following claims.

Having now described my invention, what I claim as new and desire to secure by Letters Patent, is:

1. In an empty and load brake equipment for a car, in combination, a device for varying the braking power, a movable element movable between spaced positions for adjusting said device, and an actuating element for moving said movable element, one of said elements having diverging cam surfaces associated therewith, the other of said elements having spaced cam engaging portions associated therewith and disposed between said cam surfaces, one of said cam engaging portions being adapted to engage one of the cam surfaces on movement of the actuating element in one direction, the other of the said cam engaging portions being adapted to engage the other of the said cam surfaces on movement of the actuating element in the opposite direction.

2. In an empty and load brake equipment for a car, in combination, a device for varying the braking power, a movable element movable between spaced positions for adjusting said device, an actuating element for moving said movable element, one of said elements having diverging cam surfaces associated therewith, the other of said elements having spaced cam engaging portions associated therewith and disposed between said cam surfaces, one of said cam engaging portions being adapted to engage one of the cam surfaces on movement of the actuating element in one direction, the other of said cam engaging portions being adapted to engage the other of the said cam surfaces on movement of the actuating element in the opposite direction, and means responsive to the weight of the material forming the load on the car for moving said actuating element.

3. In an empty and load brake equipment for a car, in combination, a brake pipe, a device for varying the braking power, a movable element movable between spaced positions for adjusting said device, an actuating element for moving said movable element, one of said elements having diverging cam surfaces associated therewith, the other of said elements having spaced cam engaging portions associated therewith and disposed between said cam surfaces, one of said cam engaging portions being adapted to engage one of the cam surfaces on movement of the actuating element in one direction, the other of the said cam engaging portions being adapted to engage the other of the said cam surfaces on movement of the actuating element in the opposite direction, and means responsive to the weight of the material forming the load on the car and to the pressure of the fluid in the brake pipe for moving the said actuating element.

4. In an empty and load brake equipment for a car, in combination, a device for varying the braking power, a movable member movable between spaced positions for adjusting said device, stop means associated with the said movable member and operative to prevent movement of the said member beyond either of the said spaced positions, an operating element associated with said movable member, said element being reciprocally movable, resilient means connecting the operating element and the movable member and yieldingly opposing relative movement therebetween, an actuating element associated with the operating element, and stop means associated with the actuating element and operative to limit movement thereof in either direction, one of said elements having diverging cam surfaces associated therewith, the other of said elements having spaced cam engaging portions associated therewith and disposed between said diverging cam surfaces, one of said cam engaging portions being adapted to engage one of the said cam surfaces on movement of the actuating element in one direction, the other of the cam engaging portions being adapted to engage the other of the cam surfaces on movement of the actuating element in the opposite direction, one of said cam surfaces and the stop means for the movable member and for the actuating element being arranged so that the actuating element continues to move the operating element subsequent to movement of the movable member to the position determined by the stop means associated therewith, and so that on further movement of the actuating element the resilient means yieldingly urges the movable member to the position determined by the stop means associated therewith and also yieldingly urges the actuating element to the position determined by the stop means associated therewith.

5. In an empty and load brake equipment for a car, in combination, a device for varying the braking power, a movable member movable between spaced positions for adjusting said device, stop means associated with the said movable member and operative to prevent movement of the said member beyond either of the said spaced positions, an operating element associated with said movable member, said element being reciprocally movable, resilient means connecting the operating element and the movable member and yieldingly opposing relative movement therebetween, an actuating element associated with the operating element, and stop means associated with the actuating element and operative to limit movement thereof in either direction, one of said elements having diverging cam surfaces associated therewith, the other of said elements having spaced cam engaging portions associated therewith and disposed between said diverging cam surfaces, one of said cam engaging portions being adapted to engage one of the said cam surfaces on movement of the actuating element in one direction, the other of the cam engaging portions being adapted to engage the other of the cam surfaces on movement of the actuating element in the opposite direction, each of said cam surfaces and the stop means for the movable member and for the actuating element being arranged so that the actuating element continues to move the operating element subsequent to movement of the movable member to the position determined by the stop means associated therewith, and so that on further movement of the actuating element the resilient means yieldingly urges the movable member to the position determined by the stop means associated therewith and also yieldingly urges the actuating member to the position determined by the stop means associated therewith.

6. In an empty and load brake equipment for a car, in combination, a device for varying the braking power, a movable member movable between spaced positions for adjusting said device, stop means associated with the said movable member and operative to prevent movement of the said member beyond either of the said spaced positions, an operating element associated with said movable member, said element being reciprocally movable, resilient means connecting the operating element and the movable member and yieldingly opposing relative movement therebetween, an actuating element associated with the operating element, stop means associated with the actuating element and operative to limit movement thereof in either direction, one of said elements having diverging cam surfaces associated therewith, the other of said elements having spaced cam engaging portions associated therewith and disposed between said diverging cam surfaces, one of said cam engaging portions being adapted to engage one of the said cam surfaces on movement of the actuating element in one direction, the other of the cam engaging portions being adapted to engage the other of the cam surfaces on movement of the actuating element in the opposite direction, one of said cam surfaces and the stop means for the movable member and for the actuating element being arranged so that the actuating element continues to move the operating element subsequent to movement of the movable member to the position determined by the stop means associated therewith, and so that on further movement of the actuating element the resilient means yieldingly urges the movable member to the position determined by the stop means associated therewith and also yieldingly urges the actuating member to the position determined by the stop means associated therewith, and means responsive to the weight of the material forming the load on the car for moving said actuating element.

7. In an empty and load brake equipment for a car, in combination, a device for varying the braking power, a movable member movable between spaced positions for adjusting said device, stop means associated with the said movable member and operative to prevent movement of the said member beyond either of the said spaced positions, an operating element associated with said movable member, said element being reciprocally movable, resilient means connecting the operating element and the movable member and yieldingly opposing relative movement therebetween, an actuating element associated with the operating element, stop means associated with the actuating element and operative to limit movement thereof in either direction, one of said elements having diverging cam surfaces associated therewith, the other of said elements having spaced cam engaging portions associated therewith and disposed between said diverging cam surfaces, one of said cam engaging portions being adapted to engage one of the said cam surfaces on movement of the actuating element in one direction, the other of the cam engaging portions being adapted to engage the other of the cam surfaces on movement of the actuating element in the opposite direction, each of said cam surfaces and the stop means for the movable member and for the actuating element being arranged so that the actuating element continues to move the operating element subsequent to movement of the movable member to the position determined by the stop means associated therewith, and so that on further movement of the actuating element the resilient means yieldingly urges the movable member to the position determined by the stop means associated therewith and also yieldingly urges the actuating member to the position determined by the stop means associated therewith, and means responsive to the weight of the material forming the load on the car for moving said actuating element.

8. In an empty and load brake equipment for a car, in combination, a device for varying the braking power, a movable member movable between spaced positions for adjusting said device, stop means associated with the said movable member and operative to prevent movement of the said member beyond either of the said spaced positions, an operating element associated with said movable member, said element being reciprocally movable, resilient means connecting the operating element and the movable member and yieldingly opposing relative movement therebetween, an actuating element associated with the operating element, stop means associated with the actuating element and operative to limit movement thereof in either direction, one of said elements having diverging cam surfaces associated therewith, the other of said elements having spaced cam engaging portions associated therewith and disposed between said diverging cam surfaces, one of said cam engaging portions being adapted to engage one of the said cam surfaces on movement of the actuating element in one direction, the other of the cam engaging portions being adapted to engage the other of the cam surfaces on movement of the actuating element in the opposite direction, one of said cam surfaces and the stop means for the movable member and for the actuating element being arranged so that the actuating element continues to move the operating element subsequent to movement of the movable member to the position determined by the stop means associated therewith, and so that on further movement of the actuating element the resilient means yieldingly urges the movable member to the position determined by the stop means associated therewith and also yieldingly urges the actuating member to the position determined by the stop means associated therewith, and means responsive to the weight of the material forming the load on the car and to the pressure of the fluid in the brake pipe for moving said actuating element.

9. In an empty and load brake equipment for a car, in combination, a device for varying the braking power, a movable member movable between spaced positions for adjusting said device, stop means associated with the said movable member and operative to prevent movement of the said member beyond either of the said spaced positions, an operating element associated with said movable member, said element being reciprocally movable, resilient means connecting the operating element and the movable member and yieldingly opposing relative movement therebetween, an actuating element associated with the operating element, stop means associated with the actuating element and operative to limit movement thereof in either direction, one of said elements having diverging cam surfaces associated therewith, the other of said elements having spaced cam engaging portions associated therewith and disposed between said diverging cam surfaces, one of said cam engaging portions being adapted to engage one of the said cam surfaces on movement of the actuating element in one direction, the other of the cam engaging portions being adapted to engage the other of the cam surfaces on movement of the actuating element in the opposite direction, each of said cam surfaces and the stop means for the movable member and for the actuating element being arranged so that the actuating element continues to move the operating element subsequent to movement of the movable member to the position determined by the stop means associated therewith, and so that on further movement of the actuating element the resilient means yieldingly urges the movable member to the position determined by the stop means associated therewith and also yieldingly urges the actuating member to the position determined by the stop means associated therewith, and means responsive to the weight of the material forming the load on the car and to the pressure of the fluid in the brake pipe for moving said actuating element.

10. In an empty and load brake equipment for a car, in combination, a device for varying the braking power, a member movable between spaced positions for adjusting said device, stop means associated with said movable member and operative to prevent movement of the movable member beyond either of the said spaced positions, an operating element associated with said movable member, said operating element being reciprocally movable, resilient means operatively connecting the operating element and the movable member and yieldingly opposing relative movement thereof, actuating means associated with the operating element and on movement in one direction cooperating with a cam surface carried by the operating element to move the operating element and thereby move the movable member, stop means to limit the movement of the actuating means in said one direction, the cam surface and the stop means for the movable member and for the actuating means being arranged so that the actuating element continues to move the operating element subsequent to movement of the movable member to the position determined by the stop means, and so that on further movement of the actuating means the resilient means yieldingly urges the movable member to the position determined by the stop means associated therewith, and yieldingly urges the actuating means to the position determined by the stop means associated therewith.

11. In an empty and load brake equipment for a car, in combination, a member movable between spaced positions and operative in one of said positions to condition the equipment for empty car operation and operative in the other of said positions to condition the equipment for loaded car operation, stop means associated with said movable member and operative to prevent movement of the movable member beyond either of the said spaced positions, an operating element associated with said movable member, said element being reciprocally movable, resilient means connecting the operating element and the movable member and yieldingly opposing relative movement therebetween, actuating means associated with the operating element and on movement in either direction cooperating with a cam surface carried by the movable member to move the operating element and thereby move the movable member, stop means to limit movement of the actuating means in either direction, the cam surfaces and the stop means for the movable member and for the actuating means being arranged so that the actuating means continues to move the operating element subsequent to movement of the movable member to either position determined by the stop associated therewith, and so that on further movement of the actuating means the resilient means yieldingly urges the movable member to the position determined by the stop means associated therewith, and also yieldingly urges the actuating member to the position determined by the stop means associated therewith.

12. In an empty and load brake equipment for a car, in combination, a member movable between spaced positions and operative in one of said positions to condition the equipment for empty car operation and operative in the other of said positions to condition the equipment for loaded car operation, stop means associated with said movable member and operative to prevent movement of the movable member beyond either of the said spaced positions, an operating element associated with said movable member, said element being reciprocally movable, resilient means connecting the operating element and the movable member and yieldingly opposing relative movement therebetween, an actuating element associated with the operating element, said elements having cooperating cam surfaces and cam engaging means associated therewith and operative on movement of the actuating element in either direction to move the operating element and thereby move the movable member, stop means to limit movement of the actuating element in either direction, said cam surfaces and the stop means for the movable member and for the actuating element being arranged so that the actuating element continues to move the operating element subsequent to movement of the movable member to a position determined by the stop means associated therewith, and so that on further movement of the actuating element the resilient means yieldingly urges the movable member to the position determined by the stop means associated therewith, and also yieldingly urges the actuating element to the position determined by the stop means associated therewith.

13. In an empty and load brake equipment for a car, in combination, an operating element pivotally mounted for movement between spaced positions, said operating element having opposing cam surfaces formed thereon, actuating means engageable on movement in one direction with one of said cam surfaces to effect movement of the operating element to one position, and engageable on movement in the opposite direction with the other of the said cam surfaces to effect movement of the operating element to the other of the said positions, and means responsive to the weight of the material forming the load on the car for moving said actuating means.

14. In an empty and load brake equipment for a car, in combination, a device for varying the braking power, a member movable between spaced positions for adjusting said device, stop means associated with said movable member and operative to prevent movement of the movable member beyond one of said spaced positions, an operating element associated with the said movable member, said operating element being reciprocally movable, resilient means operatively connecting the operating element and the movable member and yieldingly opposing relative movement thereof in one direction, an actuating element associated with the operating element, said elements having cooperating cam means and cam engaging means associated therewith and operative on movement of the actuating element in one direction to move the operating element and thereby move the movable member, stop means to limit movement of the actuating element in said one direction, said cam means and the stop means for the movable member and for the actuating element being arranged so that the actuating element continues to move the operating element subsequent to movement of the movable member to the position determined by the stop means associated therewith, and so that on further movement of the actuating element the resilient means yieldingly urges the movable member to the position determined by the stop means associated therewith, and also yieldingly urges the actuating element to the position determined by the stop means associated therewith.

15. In an empty and load brake equipment for a car, in combination, a device for varying the braking power, a member movable between spaced positions for adjusting said device, stop means associated with said movable member and operative to prevent movement of the movable member beyond one of said spaced positions, an operating element associated with the said movable member, said operating element being reciprocally movable, resilient means operatively connecting the operating element and the movable member and yieldingly opposing relative movement thereof in one direction, an actuating element associated with the operating element, said elements having cooperating cam means and cam engaging means associated therewith and operative on movement of the actuating element in one direction to move the operating element and thereby move the movable member, stop means to limit movement of the actuating element in said one direction, said cam means and the stop means for the movable member and for the actuating element being arranged so that the actuating element continues to move the operating element subsequent to movement of the movable member to the position determined by the stop means associated therewith, and so that on movement of the actuating element to the position determined by the stop means associated therewith the resilient means yieldingly opposes movement of the said actuating element from said position.

16. In an empty and load brake equipment for a car, in combination, mechanism for conditioning the equipment for empty and for loaded car braking and movable to one position for empty car braking and to another position for loaded car braking, a member for actuating said mechanism, means for operating said member and including a roller, said member having a cam face engageable by said roller whereby movement of said roller in one direction tends to move said member, and yielding means interposed between said mechanism and said member for yieldingly opposing movement of said member by said roller.

17. In an empty and load brake equipment for a car, in combination, mechanism for conditioning the equipment for empty and for loaded car braking and movable to one position for empty car braking and to another position for loaded car braking, a lever arm for operating said mechanism, an actuating member for said lever arm comprising elements at opposite sides of said arm, and yielding means interposed between each element and said arm.

18. In an empty and load brake equipment for a car, in combination, mechanism for conditioning the equipment for empty and for loaded car braking and movable to one position for empty car braking and to another position for loaded car braking, a lever arm for operating said mechanism, an actuating member for said lever arm having spaced elements, and an operating device adapted upon movement in one direction to actuate one of said elements and upon movement in the opposite direction to actuate the other element.

19. In an empty and load brake equipment for a car, mechanism for conditioning the equipment for empty or for loaded car braking, an element movable between spaced points for adjusting said mechanism, a member for operating said element, yielding means for transmitting force from said member to said element to move said element in one direction, and other yielding means for transmitting force from said member to said element to move said element in the other direction.

20. In an empty and load brake equipment for a car, mechanism for conditioning the equipment for empty or for loaded car braking, an element movable between spaced points for adjusting said mechanism, stop means for preventing movement of said element beyond said spaced points, a member for operating said element, yielding means for transmitting force from said member to said element to move said element in one direction, and other yielding means for transmitting force from said member to said element to move said element in the other direction.

CLYDE C. FARMER.